May 9, 1961 E. A. HENDRIE 2,983,418

TICKER TAPE CARRIER

Filed Dec. 31, 1958

Ernest A. Hendrie
INVENTOR.

BY James F. Weiler
Jefferson D. Giller
William A. Stout
ATTORNEYS

United States Patent Office 2,983,418

Patented May 9, 1961

2,983,418

TICKER TAPE CARRIER

Ernest A. Hendrie, 7 Perthuis Farms Road, La Marque, Tex.

Filed Dec. 31, 1958, Ser. No. 784,176

4 Claims. (Cl. 226—194)

The present invention relates to an apparatus for carrying ticker tape, and more particularly, relates to such apparatus for use with a ticker tape machine for supporting and visually displaying the ticker tape as it emerges from the machine.

Generally ticker tape machines are used for the transmission of stock market quotations, news, and other information which is desired to be communicated quickly. The information is printed upon a ticker tape and as is common in stockbrokers' offices the tape, as it emerges from the machine, is allowed to pass to a wastepaper basket positioned next to the machine on the floor. Therefore, persons desiring to view the tape must manually pick up and manipulate the tape to observe the information printed thereon. Also, while one person is handling the tape it is difficult and inconvenient for other people to simultaneously read the tape. It is to overcome these disadvantages that the present invention is directed.

It is an object of this invention to provide an apparatus for carrying and supporting the ticker tape as it emerges from the ticker tape machine and visually displaying the tape so that a number of people may simultaneously read the data printed thereon.

A further object of the present invention is the provision of a ticker tape carrier which is supported at an incline and therefore allows the tape to pass along the carrier by gravity.

Yet a still further object of the present invention is the provision of a ticker tape carrier that is easy to thread and provides a structure to guide and support the ticker tape whereby a plurality of persons can visually observe and read the ticker tape while it is in operation.

Another object of the present invention is to provide a ticker tape carrier that need not be attached to the ticker tape machine but which may be held in position by the weight of the ticker tape machine.

Certain devices have been developed to display the tape after it leaves the ticker tape machine but these have been expensive, complicated, and unsatisfactory.

It is therefore a further object of this invention to provide a ticker tape carrier which may be quickly and easily placed into operation, is simple and inexpensive, and yet requires no motive force to operate the tape.

Figures 1, 2, 5:
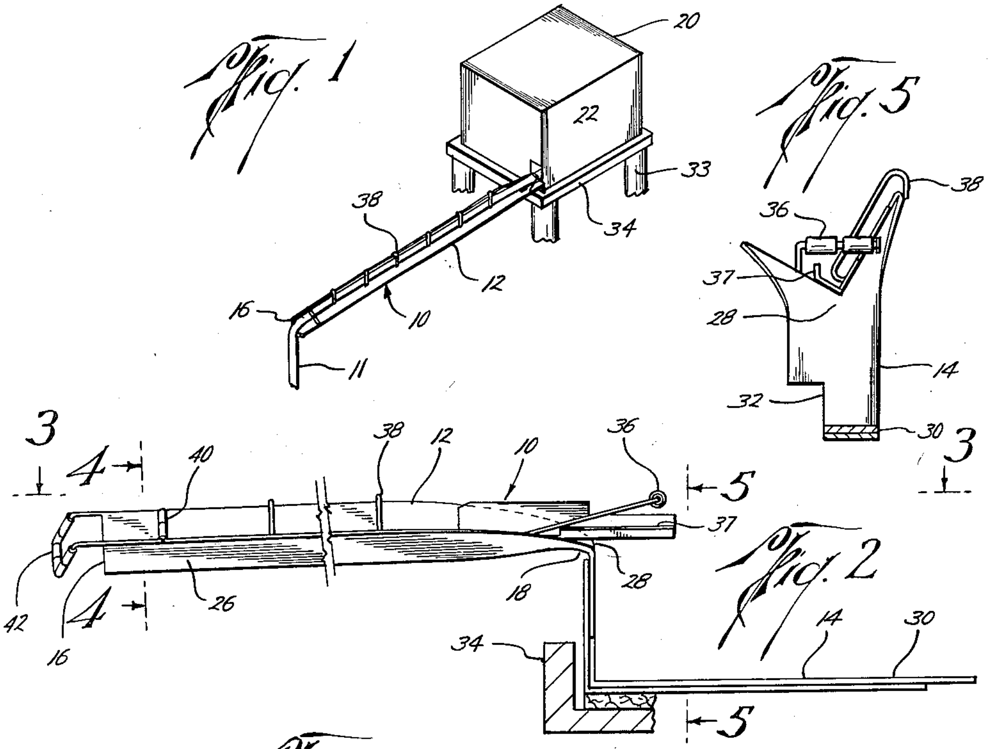
Figure 3:
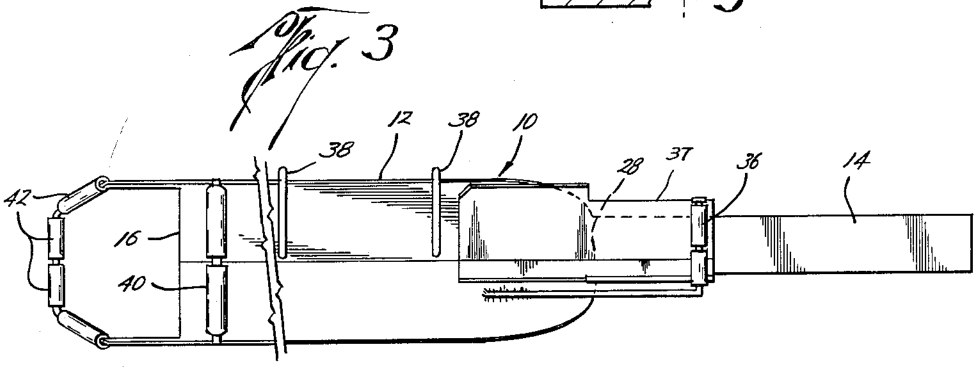
Figure 4:
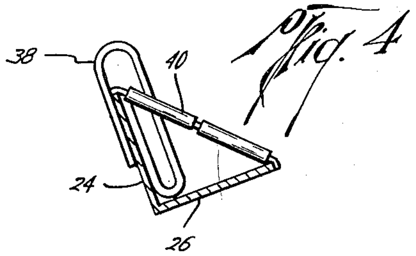

Other and further objects, features and advantages will be apparent from the following description of a presently preferred embodiment of the invention, given for the purpose of disclosure, and taken in conjunction with the accompanying drawing, where like character references designate like parts throughout the several views, and where Figure 1 is a perspective view illustrating an apparatus according to the present invention in use with a conventional ticker tape machine, Figure 2 is an elevational view illustrating an apparatus according to the invention, Figure 3 is a view taken along the line 3—3 of Figure 2, Figure 4 is a cross-sectional view taken along the line 4—4 of Figure 2, and Figure 5 is a cross-sectional view taken along the line 5—5 of Figure 2.

Referring now to the drawing and particularly to Figures 1, 2 and 3, the reference numeral 10 generally designates the ticker tape carrier of the present invention which includes an elongate body 12 which is L-shaped in cross-section, a support member 14 for supporting the carrier 10 adjacent the ticker tape opening 22 of a conventional ticker tape machine 20, a guide extension 37 and several types of tape guide supports which will be hereinafter described which are attached to the body 12.

The body 12 is of a sufficient length, preferably about three feet long, to provide a view of the carried tape 11 as may be desirable so that several persons may simultaneously observe the information on the tape. For lightness and strength the body is preferably made of a light weight metal such as aluminum. The free end 16 of the body 12 is positioned lower than the fixed end 18 so that the body 12 is positioned at an incline from the horizontal in order that the tape will move along the tape carrier 10 by the gravity pull of its own weight and thereby eliminate the need for any motive mechanism to move the tape. Preferably the body 12 is inclined about ten degrees from the horizontal thereby providing a sufficient angle for the tape to move along the body 12 by gravity, but yet maintaining the body 12 in a position to be easily readable.

As best seen in Figure 4, the body 12 has a back side 24 and a lower side 26. The back side 24 against which the back of the tape 11 will move is generally inclined with its interior face upward to provide a convenient viewing angle for the observers. The lower side 26 adds structural strength to the body 12 and helps support the lower edge of the tape 11.

At the upper end of the body 12 the body is flattened as at 28 as best seen in Figures 2, 3 and 5 and turned downwardly and there attached to a supporting member 14 which is L-shaped in elevation. The horizontal leg 30 of the supporting member 14 slides under the ticker tape machine 20 and thereby supports the body 12. Of course, other types of supporting members 14 could be utilized, but this simple member is inexpensive and supports the body 12 in position merely by the weight of the ticker tape machine 20.

The ticker tape carrier 10 is placed adjacent the opening 22 of the ticker tape machine 20. As is conventional the opening 22 is usually provided adjacent a corner of the ticker tape machine 20 which normally rests on the corner of a table 33 having an upstanding edge 34. Thus, in order to position the carrier 10 in the center of the opening 22 and over the edge 34 a recess 32 is provided in the support member 14 to fit over the edge 34 of the table 33.

A guide extension 37, which is L-shaped in cross section, is secured to the fixed end 18 of the body and is positioned so that when the tape carrier 10 is placed adjacent the opening 22 of the ticker tape machine 20 the extension 37 will project into the opening 22 and be adjacent the ticker tape machine print wheel (not shown). This insures that the tape 11 will be guided from machine 20 onto the carrier 10.

Near the fixed end 18 of the body 12 is a spring roller arm 36, Figures 2, 3 and 5, under which the ticker tape passes. This spring roller arm 36 is secured to the body 12 by any convenient means such as welding and serves as a guide. Loop guide supports 38 are provided along the body 12 to guide and support the ticker tape 11 and hold the ticker tape 11 against the upstanding wall 24 of the body 12. At the free end 16 of the body 12, as best seen in Figures 1, 2 and 3, upper and lower rollers 40 and 42, respectively, are provided which guide and allow the ticker tape 11 to pass freely from the tape carrier 10 into a wastebasket (not shown). The ticker tape passes under the upper roller 40 and over the lower roller 42.

In use, the ticker tape carrier 10 is quickly placed into operation by inserting the supporting member 14 under the ticker tape machine 20 and feeding the ticker tape 11 under the spring roller arm 36 onto the guide extension 37, through the loop supports 38, under the roller 40 and over the roller 42. As the ticker tape 11 comes from the ticker tape machine 20 it will move along the tape carrier 10 by gravity and be deposited in a wastebasket under the free end 16 of the body 12. This apparatus provides a simple device whereby several people can stand alongside the tape carrier 10 and read the tape as it passes along the upstanding side 24 of the body 12.

The present invention, therefore, is well adapted to carry out the objects and attain the ends and advantages mentioned as well as others inherent therein. While a presently preferred embodiment of the invention is given for the purpose of disclosure, certain changes in the details of construction, and arrangement of parts may be made which will readily suggest themselves to those skilled in the art and which are encompassed within the spirit of the invention and the scope of the appended claims.

What is claimed is:

1. A ticker tape carrier and visual display apparatus for use with a ticker tape machine comprising, an elongate body having first and second ends, the first end of which is positioned adjacent the ticker tape machine and above the second end, said elongate body being substantially L-shaped in cross-section and being disposed at such an incline that the ticker tape will move along the body by gravity, an L-shaped support member one end of which is secured adjacent the first end of the body and the other end adapted to slide under the ticker tape machine thereby supporting said body, a plurality of enclosed tape guide supports attached to and spaced along the body, said guide supports positioned in front of the upstanding portion of the L-shaped body to enclose the ticker tape thereby supporting the ticker tape as it moves along the body by gravity, and a guide roller attached to the first end of the body.

2. The invention of claim 1 wherein both sides of the L-shaped body are disposed upwardly thereby supporting the ticker tape and enabling a plurality of persons to view the tape as it moves along the body.

3. A ticker tape carrier and visual display apparatus for use with a ticker tape machine comprising, a solid elongate body for supporting the back of the tape, said body having first and second ends, the first end of which is positioned adjacent the ticker tape machine and above the second end of the body, said elongate body being substantially L-shaped in cross-section and being disposed at such an incline that the ticker tape will move along the body by gravity, an L-shaped support member one end of which is secured adjacent the first end of the body and the other end adapted to be positioned under the ticker tape machine thereby supporting said first end of said body adjacent the ticker tape machine, a plurality of enclosed guide supports attached to and spaced along the body, said guide supports positioned in front of the upstanding portion of the L-shaped body for enclosing and supporting the ticker tape as it moves along the body by gravity, and a guide roller attached to the second end of said body, said guide roller being substantially horizontal and sized to support the back of said tape thereby guiding the ticker tape off of the body.

4. The invention of claim 3 wherein both sides of the L-shaped body are disposed upwardly thereby supporting the ticker tape and enabling a plurality of persons to view the tape as it moves along the body.

References Cited in the file of this patent

UNITED STATES PATENTS

| | | |
|---|---|---|
| 1,700,099 | Shively | Jan. 22, 1929 |
| 2,075,993 | Mabon | Apr. 6, 1937 |
| 2,250,138 | Sheperdson | July 22, 1941 |
| 2,351,714 | Sim | June 20, 1944 |
| 2,592,469 | Rockhoff | Apr. 8, 1952 |
| 2,788,105 | Clayton | Apr. 9, 1957 |
| 2,788,106 | Clayton | Apr. 9, 1957 |